United States Patent [19]
Kuze et al.

[11] Patent Number: 5,473,046
[45] Date of Patent: Dec. 5, 1995

[54] PROCESS FOR PRODUCING A BRANCHED POLYCARBONATE

[75] Inventors: Shigeki Kuze, Ichihara; Ryozo Okumura; Seiji Takahashi, both of Sodegaura, all of Japan

[73] Assignee: Idemitsu Petrochemical Co., Ltd., Tokyo, Japan

[21] Appl. No.: 318,259

[22] Filed: Oct. 5, 1994

[51] Int. Cl.$^6$ .................................................. C08G 64/00
[52] U.S. Cl. ........................................... 528/204; 528/196
[58] Field of Search ..................................... 528/196, 204

[56] References Cited

U.S. PATENT DOCUMENTS

| | | |
|---|---|---|
| Re. 27,682 | 6/1973 | Schnell et al. . |
| 4,415,723 | 11/1983 | Hedges et al. .......................... 528/204 |
| 4,426,513 | 1/1984 | Mark . |
| 4,446,298 | 5/1984 | Mark et al. . |

FOREIGN PATENT DOCUMENTS

| | | |
|---|---|---|
| 0299545 | 1/1989 | European Pat. Off. . |
| 0378858 | 7/1990 | European Pat. Off. . |
| 0411433 | 2/1991 | European Pat. Off. . |

*Primary Examiner*—James J. Seidleck
*Assistant Examiner*—Terressa Mosley
*Attorney, Agent, or Firm*—Oblon, Spivak, McClelland, Maier, & Neustadt

[57] ABSTRACT

A process for producing a branched polycarbonate which comprises using a branching agent containing 200 ppm or less of sulfur; a branched polycarbonate which is prepared by the interfacial method and contains 1.0 ppm or less of residual sulfur as an impurity; and a branched polycarbonate which is prepared by the melting method and contains 2.0 ppm or less of residual sulfur as an impurity; are provided. When the branched polycarbonate is produced by the interfacial method, the branched polycarbonate produced does not show deterioration in heat stability or cause mold corrosion. When the branched polycarbonate is produced by the melting method, the branched polycarbonate produced does not show deterioration in heat stability or in color tone.

8 Claims, No Drawings

PROCESS FOR PRODUCING A BRANCHED POLYCARBONATE

BACKGROUND OF THE INVENTION

1. Field of the Invention

The present invention relates to a novel branched polycarbonate and a process for producing the same. More particularly, the present invention relates to a branched polycarbonate which is excellent in qualities such as heat stability, resistance to corrosion of molds, color tone and the like, and a process for producing the same.

2. Description of the Related Arts

As the process for producing polycarbonate (hereinafter referred to as PC), a method of directly bringing an aromatic dihydroxy compound such as bisphenol A into reaction with phosgen (the interfacial method), and a method of transesterifying an aromatic dihydroxy compound such as bisphenol A and a carbonic ester such as diphenylcarbonate in molten state (the melting method) are generally known. Among PCs obtained by such methods, linear PCs generally need improvement in molding properties such as melt elasticity and melt strength. For improving the molding properties, branching of PC by copolymerization of a polyfunctional organic compound is proposed, for example, in Japanese Patent Publications Showa 44(1969)-17149, Showa 47(1972)-23918 and Showa 60(1985)-11733.

However, when a branched PC is produced by using a conventional branching agent by the interfacial method, the branched PC obtained is inferior in heat stability and, moreover, causes a problem that molds are corroded. On the other hand, when a branched PC is produced by using a conventional branching agent by the melting method, the branched PC obtained is again inferior in heat stability and, moreover, causes a problem that color tone is inferior.

SUMMARY OF THE INVENTION

An object of the present invention is to provide a branched PC having such excellent properties that no deterioration in heat stability is found and no corrosion of molds is caused when the branched PC is produced by the interfacial method, and no deterioration in heat stability is found and no inferior color tone is caused when the branched PC is produced by the melting method.

Another object of the present invention is to provide a process for producing the branched PC described above.

In the course of study to accomplish the above object, the present inventors have discovered that the objects of the present invention described above can be achieved by decreasing content of sulfur in the branching agent used for the production. The present invention was completed on the basis of the discovery.

Accordingly, the present invention provides a process for producing a branched polycarbonate which comprises using a branching agent, preferably a compound represented by the following general formula (I), containing 200 ppm or less of sulfur.

The present invention also provides a branched polycarbonate which is prepared by the interfacial method and contains 1.0 ppm or less of residual sulfur as an impurity.

The present invention also provides branched polycarbonate which is prepared by the melting method and contains 2.0 ppm or less of residual sulfur as an impurity.

The branched polycarbonates described above preferably contains units of a branching agent represented by the following general formula (I).

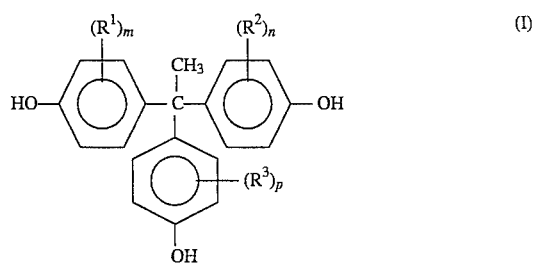

In the general formula (I), $R^1$, $R^2$ and $R^3$ indicate each hydrogen, an alkyl group having 1 to 5 carbon atoms or halogen, and m, n and p indicate each an integer of 0 to 4.

Other and further objects, features and advantages of the invention will appear more fully from the following description.

DESCRIPTION OF PREFERRED EMBODIMENTS

The present invention is described in more detail in the following.

In the present invention, the amount of sulfur contained in the branching agent is limited to 200 ppm or less, preferably 150 ppm or less, more preferably 100 ppm or less. When the amount of sulfur is more than 200 ppm, the advantageous effect of the present invention cannot be sufficiently obtained. The sulfur contained in the branching agent as an impurity is found as: residual antioxidants of sulfur compounds such as $Na_2S_2O_3$ contained in various kinds of phenol which are used as materials of the branching agent; residual sulfur in the form of FeS, CuS or the like which is produced by reaction of the antioxidants with copper or iron of the material forming the reactor; and sulfur derived from catalyst components used in the preparation of the branching agent.

In the production of the branched PC by the interfacial method, the residual sulfur in the branching agent described above is considered to accelerate heat decomposition of halogen-containing solvents left remaining in the polymer to cause deterioration of heat stability, and also to generate acidic gas such as hydrochloric acid and related acids thereof, leading to problems such as corrosion of molds and the like. In the production of the branched PC by the melting method, the above-described sulfur components present in the reaction system is considered to accelerate oxidative degradation of bisphenols at the initial period of the reaction, leading to deterioration of heat stability and formation of polymers having inferior color tone.

The branching agent containing 200 ppm or less of sulfur used in the present invention can be prepared from a branching agent containing more than 200 ppm of sulfur by decreasing the content of sulfur to 200 ppm or less by using various methods. For example, the branching agent containing 200 ppm or less of sulfur can be obtained by dissolving a branching agent containing more than 200 ppm of sulfur in an alkali, such as a solution of sodium hydroxide, and then filtering the solution through a filter of about 10 μm.

When the branched PC of the present invention is prepared by the interfacial method, the PC can be prepared more specifically by one of the following two methods. (1) A difunctional phenol and phosgen are brought into reaction with each other to prepare a polycarbonate oligomer. The polycarbonate oligomer is brought into preliminary condensation with a polyfunctional organic compound having three or more functional groups as the branching agent in such a condition of stirring that the interfacial area of the emulsion is 40 m²/liter or more. The product is then brought into polycondensation with a difunctional phenol and a monofunctional phenol in such a condition of stirring that the interfacial area of the emulsion is again 40 m²/liter or more. (2) A difunctional phenol, a polyfunctional organic compound having three or more functional groups as the branching agent and phosgen are brought into reaction with each other for phosgenation. The reaction product is brought into reaction with a monofunctional phenol and then with a difunctional phenol to prepare a PC oligomer. The PC oligomer thus prepared is brought into polycondensation with a difunctional phenol in such a condition of stirring that the interfacial area of the emulsion is 40 m²/liter or more.

In the process (1) described above, the branched PC is prepared through the three stages of the oligomerization, the preliminary condensation and the polycondensation, which are described more specifically in the following. First, a PC oligomer is derived from a difunctional phenol and phosgen. Then, the PC oligomer thus obtained is brought into the preliminary condensation with a polyfunctional organic compound having three or more functional groups used as the branching agent in such a condition of stirring that the interfacial area of the emulsion is 40 m²/liter or more. Subsequently, the product of the preliminary condensation obtained above is brought into polycondensation with a difunctional phenol and a monofunctional phenol as the terminal stopper in such a condition of stirring that the interfacial area of the emulsion is again 40 m²/liter or more. In each stage, catalysts and solvents may be added if necessary.

As the difunctional phenol used for the preparation of the PC oligomer, bisphenols are preferable and 2,2-bis(4-hydroxyphenyl)propane [bisphenol A] is particularly preferable. A part or the total amount of bisphenol A may be replaced with other difunctional phenols. Examples of the difunctional phenol other than bisphenol A include various kinds of bisphenol. Examples of the bisphenol includes: dihydroxyarylalkanes, such as bisphenol A, bis(4-hydroxyphenyl)methane, bis(4-hydroxyphenyl)phenylmethane, bis(4-hydroxyphenyl)naphthylmethane, bis(4-hydroxyphenyl)-( 4-isobutylphenyl)methane, diphenyl-bis(4-hydroxyphenyl)methane, bis(3,5-dichloro-4-hydroxyphenyl)methane, bis(3,5-dimethyl- 4-hydroxyphenyl)methane, 1,1-bis(4-hydroxyphenyl)ethane, 1-phenyl- 1,1-bis-(4-hydroxyphenyl)ethane, 1-naphthyl-1,1-bis(4-hydroxyphenyl)ethane, 1,2-bis(4-hydroxyphenyl)ethane, 2-methyl-1,1-bis(4hydroxyphenyl)propane, 2,2-bis(3,5-dimethyl-4-hydroxyphenyl)propane, 1-ethyl-1,1-bis(4-hydroxyphenyl)propane, 2,2-bis(3,5-dichloro-4-hydroxyphenyl)propane, 2,2-bis(3,5-dibromo-4-hydroxyphenyl)propane, 2,2-bis(3-chloro-4-hydroxyphenyl)propane, 2,2-bis(3-methyl-4-hydroxyphenyl)propane, 2,2-bis(3-fluoro-4-hydroxyphenyl)propane, 1,1-bis(4-hydroxyphenyl)butane, 2,2-bis(4-hydroxyphenyl)butane, 1,4-bis(4-hydroxyphenyl)butane, 1,1-bis(4-hydroxyphenyl)isobutane, 2,2-bis(4-hydroxyphenyl)pentane, 4-methyl-2,2-bis(4-hydroxyphenyl)pentane, 1,1-bis(4-hydroxyphenyl)cyclohexane, 1,1-bis(3,5-dichloro-4-hydroxyphenyl)cyclohexane, 2,2-bis(4-hydroxyphenyl)hexane, 4,4-bis(4-hydroxyphenyl)heptane, 2,2-bis(4-hydroxyphenyl)nonane, 1,10-bis(4-hydroxyphenyl)decane, 1,1-bis(4-hydroxyphenyl)cyclododecane, 2,2-bis(4-hydroxyphenyl )propane, 2,2-bis(4-hydroxyphenyl)butane, and the like; dihydroxyarylsulfones, such as bis(4-hydroxyphenyl)sulfone, bis(3,5-dimethyl-4-hydroxyphenyl)sulfone, and bis(3-chloro-4-hydroxyphenyl)sulfone; dihydroxyaryl ethers, such as bis(4-hydroxyphenyl)ether, and bis(3,5-dimethyl-4-hydroxyphenyl) ether; dihydroxyphenyl ketones, such as 4,4'-dihydroxybenzophenone, and 3,3',5,5'-tetramethyl-4,4'-dihydroxybenzophenone; dihydroxyaryl sulfides, such as bis(4-hydroxyphenyl) sulfide, bis(3-methyl-4-hydroxyphenyl) sulfide, and bis(3,5-dimethyl-4-hydroxyphenyl) sulfide; dihydroxyaryl sulfoxides, such as bis(4-hydroxyphenyl)sulfoxide; dihydroxydiphenyls, such as 4,4'-dihydroxydiphenyl; dihydroxybenzenes, such as hydroquinone, resorcinol, and methylhydroquinone; and dihydroxynaphthalenes, such as 1,5-dihydroxynaphthalene and 2,6-dihydroxynaphthalene. The difunctional phenol may be used singly or as a combination of two or more kinds.

Examples of the solvent which may be used include chlorinated hydrocarbons, such as dichloromethane (methylene chloride), 1,1-dichloroethane, 1,2-dichloroethane, 1,1,1-trichloroethane, 1,1,2-trichloroethane, 1,1,1,2-tetrachloroethane, pentachloroethane, hexachloroethane, chlorobenzene, chloroform and carbon tetrachloride; acetophenone; and other various kinds of inert organic solvent. The solvent may be used singly or as a mixture of two or more kinds. Among these solvents, methylene chloride is particularly preferable.

In the present method (1), the PC oligomer is obtained by bringing one kind of the difunctional phenol or a mixture of two or more kinds of the difunctional phenol into reaction with phosgen by a conventional method after dissolving the difunctional phenol into the inert solvent described above, if necessary. For example, the reaction mixture containing the components described above is allowed to react in such a stirring condition that the reaction mixture is in a turbulent flow. The condition of the stirring, such as speed of the stirring, is not particularly limited so long as the reaction takes place in a turbulent flow of the reaction mixture. In general, the stirring is effected at a speed of 400 rpm or higher. Temperature of the reaction is 0° to 50° C., preferably 5° to 40° C. Time of the reaction is varied depending on the situation. In general, the time of the reaction is 10 minutes to 6 hours, preferably 30 minutes to 3 hours when the reaction mixture is stirred at the speed described above. Degree of polymerization of the oligomer or the cooligomer obtained by the above reaction process is 20 or lower, preferably 2 to 10.

In the method (1) described above, the branching agent used in the process of the preliminary condensation is a polyfunctional organic compound having three or more functional groups. More specifically, the branching agent is an organic compound having three or more functional groups, such as hydroxyl group, carboxyl group, amino group, imino group, formyl group, acid halide group, haloformate group, and the like, in a molecule. Examples of the branching agent include: phloroglucinol, mellitic acid, trimellitic acid, trimellitic chloride, trimellitic anhydride, gallic acid, n-propyl gallate, protocatechuic acid, pyromellitic acid, pyromellitic dianhydride, α-resorcylic acid, β-resorcylic acid, resorcylaldehyde, trimellityl chloride, trimellityl trichloride, 4-chloroformylphthalic anhydride, benzophenonetetracarboxylic acid, 2,4,4'-trihydroxybenzophenone, 2,2'-4,4'-tetrahydroxybenzophenone, 2,4,4'-trihydroxyphenyl ether, 2,2',4,4'-tetrahydroxyphenyl ether, 2,4,4'-trihydroxydiphenyl-2-propane, 2,2'-bis( 2,4-dihydroxy)propane, 2,2',4,4'-tetrahydroxydiphenylmethane, 2,4,4'-trihydroxydiphenylmethane, 1-[α-methyl-α-(4'-hydroxyphenyl)ethyl]

-4-[α',α'-bis(4"-hydroxyphenyl)ethyl]benzene, α,α',α"-tris(4-hydroxyphenyl)- 1,3,5-triisopropylbenzene, 2,6-bis(2'-hydroxy-5'-methylbenzyl)- 4-methylphenol, 4,6-dimethyl-2,4,6-tris(4'-hydroxyphenyl)heptene- 2, 4,6-dimethyl-2,4,6-tris(4'-hydroxyphenyl)-heptane, 1,3,5-tris( 4'-hydroxyphenyl)-benzene, 1,1,1-tris(4'-hydroxyphenyl)-ethane, 2,2-bis[ 4,4-bis(4'-hydroxyphenyl)cyclohexyl]-propane, 2,6-bis(2'-hydroxy-5'-isopropylbenzyl)- 4-isopropylphenol, bis[2-hydroxy-3-(2'-hydroxy-5'-methylbenzyl)-5-methylphenyl]methane, bis[2-hydroxy-3-(2'-hydroxy-5'-isopropylbenzyl)- 5-methylphenyl]methane, tetrakis(4-hydroxyphenyl)methane, tris(4-hydroxyphenyl)phenylmethane, 2',4',7-trihydroxyflavan, 2,4,4-trimethyl-2',4',7-trihydroxyflavan, 1,3-bis(2',4'-dihydroxyphenylisopropyl)benzene, tris(4'-hydroxyaryl)-amyl-s-triazines, 1-[α-methyl-α -(4'-hydroxyphenyl)ethyl]-3-[α',α'-bis(4"-hydroxyphenyl)ethyl]benzene, isatin bis(o-cresol), and the like. The branching agent may be used singly or as a combination of two or more kinds. In the present invention, the compounds represented by the general formula (I) described above are preferably used among the compounds described above. Particularly preferable examples of the compound represented by the general formula (I) include: 1,1,1-tris(4-hydroxyphenyl)ethane, 1,1,1-tris( 4-hydroxy-3-methylphenyl)ethane, 1,1,1-tris(4-hydroxy-3,5-dimethylphenyl)ethane, 1,1,1-tris(3-chloro-4-hydroxyphenyl)ethane, 1,1,1-tris(3,5-dichloro-4-hydroxyphenyl)ethane, 1,1,1-tris(3-bromo-4-hydroxyphenyl)ethane, 1,1,1-tris(3,5-dibromo-4-hydroxyphenyl)ethane, tris(4-hydroxyphenyl)methane, tris(4-hydroxy-3-methylphenyl)methane, tris(4-hydroxy-3,5-dimethylphenyl)methane, tris(3-chloro-4-hydroxyphenyl)methane, tris(3,5-dichloro-4-hydroxyphenyl)methane, and tris(3-bromo- 4-hydroxyphenyl)methane, tris(3,5-dibromo-4-hydroxyphenyl)methane.

The preferable catalyst includes tertiary amines such as triethylamine, and halogen salts of quaternary amines, such as tetraethylammonium chloride. The amount of the catalyst in a mol ratio to the chloroformate group in the oligomer is $1.0 \times 10^{-3}$ to $1.0 \times 10^{-2}$, preferably $1.0 \times 10^{-3}$ to $8.0 \times 10^{-3}$.

As described above, the branching agent and the catalyst described above are added to the polycarbonate oligomer and the preliminary condensation is conducted. The branching agent is added in such an amount that the content of the unit of the branching agent in the branched polycarbonate finally obtained is generally 0.05 to 2.0 % by mol, preferably 0.1 to 1.0% by mol based on the amount of the unit of the difunctional phenol. The branching agent is added together with an aqueous solution of sodium hydroxide. The amount of sodium hydroxide in an equivalent ratio to the phenolic hydroxyl group in the branching agent is 1 to 2, preferably 1.1 to 1.5. The amount of the aqueous phase in the reaction mixture in a volume ratio to the organic phase is 0.1 to 5, preferably 0.2 to 2. In the preliminary condensation, baffle boards are attached to the reactor containing the reaction mixture or a homogenizer is employed so that the reaction mixture is mixed in such a stirring condition that the interfacial area of the emulsion is 40 m$^2$/liter or more, preferably 50 to 1000 m$^2$/liter. When the interfacial area is less than 40 m$^2$/liter, degree of the branching may be decreased.

According to the present method (1), the difunctional phenol and the monofunctional phenol as the terminal stopper are added to the reaction solution of the preliminary condensation which contains the oligomer or the co-oligomer, the branching agent, the catalyst and the solvent, and the polycondensation is conducted. The divalent phenol used here may be the same as or different from the divalent phenol used in the oligomerization. The difunctional phenol and the monofunctional phenol are added as an aqueous sodium hydroxide solution similarly to the process described above. The reaction mixture containing the above components are mixed by stirring and the polycondensation is conducted.

The amount of the organic phase in the reaction mixture of the polycondensation in a volume ratio to the aqueous phase is 0.1 to 5, preferably 0.2 to 2. The amount of the difunctional phenol in a mol ratio to the chloroformate group in the oligomer is 0.4 to 0.55, preferably 0.42 to 0.5

As the monofunctional phenol used as the terminal stopper, various kinds of phenol can be used. Examples of the monofunctional phenol include p-tert-butylphenol, phenol, p-cumylphenol, p-tert-octylphenol, pentabromophenol, and tribromophenol. Among these compounds, p-tert-butylphenol is preferable. The amount of the monofunctional phenol in a mol ratio to the chloroformate group in the oligomer is 0.02 to 0.20, preferably 0.04 to 0.17.

The reaction mixture is mixed in such a stirring condition that the interfacial area of the emulsion is 40 m$^2$/liter or more, preferably 50 to 1000 m$^2$/liter. Method of the stirring is not particularly limited but stirring in the reactor equipped with baffle boards or stirring by using a homogenizer is preferable. The interfacial area A of the emulsion in the condition of stirring is obtained by measuring the volume fraction of the dispersed phase ø and the average diameter of the dispersed phase d and then calculating according to the equation: A=6ø/d.

In the present method, the polycondensation reaction is continued until viscosity of the reaction mixture is increased. Time of the polycondensation is different depending on the situation. The time of the condensation is generally 30 minutes to 2 hours when the reaction mixture is stirred in the condition described above.

After the reaction mixture is treated with conventional finishing processes, such as washing and separating, the desired branched polycarbonate of the present invention can be obtained.

In the method (2) described above, the branched polycarbonate is produced through the three stages of the phosgenation, the oligomerization and the polycondensation. First, the phosgenation is conducted with a difunctional phenol, a polyfunctional organic compound having three or more functional groups, and phosgen. Then, a PC oligomer is derived by reaction of the reaction product with a monofunctional phenol, followed by reaction with a difunctional phenol.

The oligomer thus obtained is brought into polycondensation with the difunctional phenol in such a stirring condition that the interfacial area of the emulsion is 40 m$^2$/liter or more. In each stage, catalysts and solvents may be added if necessary.

The difunctional phenol, the polyfunctional organic compound having three or more functional groups, the monofunctional phenol, and the solvent used in the present method (2) are similar to those used in the method (1) described above.

In the present method (2), the PC oligomer is obtained by bringing one kind of the difunctional phenol or a mixture of two or more kinds of the difunctional phenol and one kind of the polyfunctional organic compound having three or more functional groups or a mixture of two or more kinds of the polyfunctional organic compound into reaction with phosgen by a conventional method, and then bringing the reaction product into reaction with the monofunctional phenol, and subsequently with the difunctional phenol. For example, the reaction mixture containing the components described above is allowed to react in such a stirring condition that the reaction mixture is in a turbulent flow. The condition of the stirring, such as speed of the stirring, is not particularly limited so long as the reaction takes place in a turbulent flow of the reaction mixture. In general, the stirring is effected at a speed of 400 rpm or higher. Temperature of the reaction is 0° to 50° C., preferably 5° to 40° C. Time of the reaction is varied depending on the situation. In general, the time of the reaction is 10 minutes to 6 hours, preferably 30 minutes to 3 hours, when the reaction mixture is stirred at the speed described above. The reaction of the monofunctional phenol and the reaction of the difunctional phenol in the subsequent stages are conducted similarly to the process (1) described above. Degree of polymerization of the oligomer or the co-ologomer obtained by the above reaction process is 20 or lower, preferably 2 to 10.

The branching agent is added in such an amount that the content of the unit of the branching agent in the branched polycarbonate finally obtained is generally 0.05 to 2.0% by mol, preferably 0.1 to 1.0% by mol based on the amount of the unit of the difunctional phenol. The branching agent is added together with an aqueous solution of sodium hydroxide. The monofunctional phenol is added in such an amount that the content of the unit of the monofunctional phenol in the branched polycarbonate finally obtained is generally 0.85 to 8.5% by mol, preferably 1.7 to 7.0% by mol based on the amount of the unit of the difunctional phenol.

In the method (2), the difunctional phenol and the catalyst similar to those used in the method (1) can be used. The amount of the catalyst in a mol ratio to the chloroformate group in the oligomer is $1.0 \times 10^{-3}$ to $1.0 \times 10^{-2}$, preferably $1.0 \times 10^{-3}$ to $8.0 \times 10^{-3}$.

The reaction mixture is stirred in such a condition that the interfacial area of the emulsion is 40 $m^2$/liter or more, preferably 50 to 1000 $m^2$/liter. The stirring of the reaction mixture can be conducted by any kind of method. It is preferred that baffle boards are attached to the reactor containing the reaction mixture or a homogenizer is employed.

In the present method, the polycondensation reaction is continued until viscosity of the reaction mixture is increased. The time of the polycondensation is different depending on the situation. The time is generally 30 minutes to 2 hours when the reaction mixture is stirred in the condition described above.

After the reaction mixture is treated with conventional finishing processes, such as washing and separating, the desired branched polycarbonate of the present invention can be obtained.

When the branched PC of the present invention is prepared by the melting method, various kinds of dihydroxy compound can be used. For example, at least one compound selected from the group consisting of aromatic dihydroxy compounds, aliphatic dihydroxy compounds, bis-esters of aromatic dihydroxy compounds, bis-esters of aliphatic dihydroxy compounds, carbonates of aromatic dihydroxy compounds, and carbonates of aliphatic dihydroxy compounds, can be used as the dihydroxy compound.

Examples of the aromatic dihydroxy compound include: bis(hydroxyaryl)alkanes, such as bis(4-hydroxyphenyl)methane, 1,1-bis(4-hydroxyphenyl)ethane, 2,2-bis(4-hydroxyphenyl)propane (generally called bisphenol A), 2,2-bis(4-hydroxyphenyl)butane, 2,2-bis(4-hydroxyphenyl)octane, 2,2-bis(4-hydroxyphenyl)phenylmethane, 2,2-bis(4-hydroxy-1-methylphenyl)propane, 1,1-bis(4-hydroxy-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, and 2,2-bis(4-hydroxy-3,5-dibromophenyl)propane; bis(hydroxyaryl)cycloalkanes, such as 1,1-bis(4-hydroxyphenyl)cyclopentane, 1,1-bis(4-hydroxyphenyl)cyclohexane, and 1,1-bis(4-hydroxyphenyl)-3,5,5-trimethylcyclohexane; dihydroxyaryl ethers, such as 4,4'-dihydroxydiphenyl ether, and 4,4'-dihydroxy-3,3'-dimethylphenyl ether; dihydroxydiaryl sulfides, such as 4,4'-dihydroxydiphenyl sulfide, and 4,4'-dihydroxy-3,3'-dimethyldiphenyl sulfide; dihydroxyarylsulfoxides, such as 4,4'-dihydroxydiphenyl sulfoxide, and 4,4'-dihydroxy-3,3'-dimethyldiphenyl sulfoxide; dihydroxydiarylsulfones, such as 4,4'-dihydroxydiphenylsulfone, and 4,4'-dihydroxy-3,3'-dimethyldiphenylsulfone; dihydroxybenzenes; and halogen-substituted and alkyl-substituted dihydroxybenzenes, such as 1,4-dihydroxy-2,5-dichorobenzene, and 1,4-dihydroxy-3-methylbenzene.

The aliphatic dihydroxy compound includes various kinds of compounds. Examples of the aliphatic dihydroxy compound include: butane-1,4-diol, 2,2-dimethylpropane-1,3-diol, hexane-1,6-diol, diethylene glycol, triethylene glycol, tetraethylene glycol, octaethylene glycol, dipropylene glycol, N,N-methyldiethanolamine, cyclohexane-1,3-diol, cyclohexane-1,4-diol, 1,4-dimethylolcyclohexane, p-xylylene glycol, 2,2-bis(4-hydroxycyclohexyl)-propane, and ethoxy or propoxy derivatives of difunctional alcohols or difunctional phenols, such as bis-oxyethyl-bisphenol A, bis-oxyethyl-tetrachlorobisphenol A, and bis-oxyethyl-tetrachlorohydroquinone.

Examples of the bis-esters of aromatic dihydroxy compounds, the bis-esters of aliphatic dihydroxy compounds, the carbonates of aromatic dihydroxy compounds and the carbonates of aliphatic dihydroxy compounds include bis-esters of the compounds described above which are represented by the following general formulas (II) and (IV), and carbonates of the compounds described above which are represented by the following general formulas (III) and (V):

(II)

(III)

(IV)

(V)

In the formulas, R indicates a group formed by eliminating two hydroxyl groups from an aliphatic dihydroxy compound, $Ar_1$ indicates a group formed by eliminating two hydroxyl groups from an aromatic dihydroxy compound, and $R^1$ indicates an alkyl group having 1 to 6 carbon atoms or a cycloalkyl group having 4 to 7 carbon atoms.

The carbonates of dihydroxy compounds include diaryl carbonates, dialkyl carbonates and alkyl aryl carbonates. Preferable diaryl carbonates, dialkyl carbonates, and alkyl aryl carbonates include compounds represented by the following general formulas (VI), (VII) and (VIII), respectively.

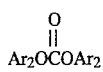 (VI)

 (VII)

 (VIII)

In the above general formulas, $R^1$ is as defined above, and $Ar_2$ indicates an aryl group.

Examples of the diaryl carbonate include diphenyl carbonate, ditolyl carbonate, bis(chlorophenyl) carbonate, m-cresyl carbonate, dinaphthyl carbonate, and bis(diphenyl) carbonate.

Examples of the dialkyl carbonate include diethyl carbonate, dimethyl carbonate, dibutyl carbonate, and dicyclohexyl carbonate.

Example of the alkyl aryl carbonate include methyl phenyl carbonate, ethyl phenyl carbonate, butyl phenyl carbonate, and cyclohexyl phenyl carbonate.

Diphenyl carbonate is preferable among these carbonates.

In the present invention, a terminal stopper may be used if necessary. Examples of such terminal stopper include o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, o-cyclohexylphenol, m-cyclohexylphenol, p-cyclohexylphenol, o-phenylphenol, m-phenylphenol, p-phenylphenol, o-n-nonylphenol, m-n-nonylphenol, p-n-nonylphenol, o-cumylphenol, m-cumylphenol, p-cumylphenol, o-naphthylphenol, m-naphthylphenol, p-naphthylphenol, 2,6-di-t-butylphenol, 2,5-di-t-butylphenol, 2,4-di-t-butylphenol, 3,5-di-t-butylphenol, 2,5-di-t-cumylphenol, 3,5-dicumylphenol, compounds having the following formulas:

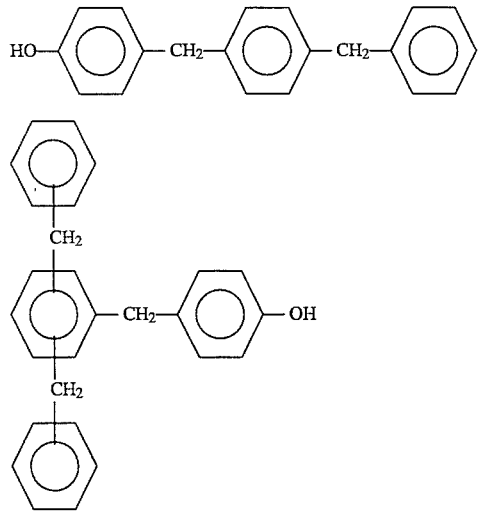

and chroman derivatives, such as monofunctional phenols having the following formulas:

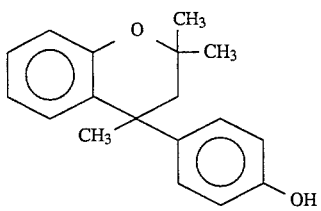

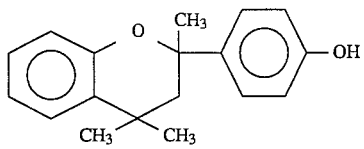

Among these phenols, p-tert-butylphenol, p-cumylphenol, and p-phenylphenol are preferable although the kind of the phenol is not particularly limited in the present invention.

As the terminal stopper other than those described above, diesters of carbonic acid may also be used. Examples of such terminal stopper of diester of carbonic acid include: carbobutoxyphenyl phenyl carbonate, methylphenyl buylphenyl carbonate, ethylphenyl butylphenyl carbonate, dibutyldiphenyl carbonate, biphenyl phenyl carbonate, dibiphenyl carbonate, cumylphenyl phenyl carbonate, dicumylphenyl carbonate, naphthylphenyl phenyl carbonate, dinaphthylphenyl carbonate, carbopropoxyphenyl phenyl carbonate, carboheptoxyphenyl phenyl carbonate, carbomethoxy-t-butylphenyl phenyl carbonate, carbopropoxyphenylmethylphenyl phenyl carbonate, chromanyl phenyl carbonate, dichromanyl carbonate, and compounds represented by the following general formulas:

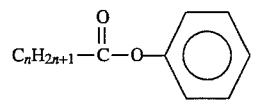

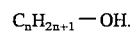

(In the formulas, n indicates an integer of 7 to 30.)

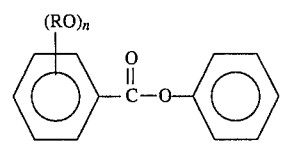

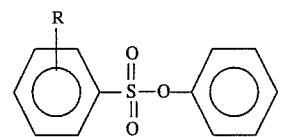

(In the formulas, R indicates an alkyl group having 1 to 12 carbon atoms, and n indicates an integer of 1 to 3.)

In the present invention, catalysts, antioxidants, and inert solvents described in the following may be used if necessary. Examples of the catalyst include: elements, oxides, hydroxides, amide compounds, alcoholates, and phenolates of alkali metals and alkaline earth metals; basic metal oxides, such as ZnO, PbO, and $Sb_2O_3$; organotitanium compounds; soluble manganese compounds; binary catalysts containing an acetate or a nitrogen-containing basic compounds of Ca, Mg, Zn, Pb, Sn, Mn, Cd, and Co, and a boron compounds;

catalysts containing a nitrogen-containing basic compound and an alkali (alkaline earth) metal compound; and catalysts containing a nitrogen-containing basic compound, an alkali (alkaline earth) metal compound and a boron compound.

Examples of the antioxidant include phosphorus antioxidants, such as tris(nonylphenyl) phosphite, trisphenyl phosphite, 2-ethylhexyl diphenyl phosphite, trimethyl phosphite, triethyl phosphite, tricresyl phosphite, and triaryl phosphites.

Examples of the inert solvent include aromatic compounds, such as diphenyl ether, halogenated diphenyl ether, benzophenone, polyphenyl ethers, dichlorobenzene, and methylnaphthalene; gases, such as carbon dioxide, dinitrogen oxide, and nitrogen; chlorofluorohydrocarbons; alkanes, such as ethane, and propane; cycloalkanes, such as cyclohexane, tricyclo(5.2.10)-decane, cyclooctane, and cyclodecane; alkenes, such as ethene, and propene; sulfur hexafluoride; and the like various kinds of solvents.

In the present method, branching agents similar to those used in the interfacial method can be used.

The PC obtained by the process of the present invention can be used for application by mixing conventional ingredients, such as plasticizers, pigments, lubricants, mold release agents, stabilizers, inorganic fillers, and the like.

The PC obtained by the present method can be blended with polyolefins, polystyrenes, and the like. In particular, the PC is effectively used together with polyphenylene ethers, plyether nitriles, polysiloxane compounds modified at the ends thereof, modified polypropylenes and modified polystyrenes, each having OH groups, COOH groups, or $NH_2$ groups at the ends of the molecule.

More specifically, the reaction in the present method can be conducted according to the following method.

The material (A) which is a dihydroxy compound selected from aromatic dihydroxy compounds, aliphatic dihydroxy compounds, bis-esters of aromatic dihydroxy compounds, carbonates of aromatic dihydroxy compounds, bis-esters of aliphatic dihydroxy compounds, and carbonates of aliphatic dihydroxy compounds, and the material (B) which is a carbonic acid compound selected from diaryl carbonates, dialkyl carbonates and alkyl aryl carbonates, are used in such amounts that the mol ratio of the carbonic acid compound of the material (B) to the dihydroxy compound of the material (A) is 0.8 to 1.5, preferably 0.9 to 1.20.

It is preferred that the amount of the terminal stopper present in the reaction system is in the range of 0.05 to 10% by mol based on the dihydroxy compound of the material (A). When the amount is in this range, a polycarbonate having sufficiently excellent heat resistance and water resistance can be obtained and rate of the polycondensation is increased because terminal hydroxyl groups in the obtained polycarbonate are sealed off.

The whole amount of the monofunctional phenol or the diester compound of carbonic acid may be added to the reaction system in advance. In another method, a part of the monofunctional phenol or the diester compound of carbonic acid may be added in advance and the remaining amount may be added with the progress of the reaction. In still another method, the whole amount may be added to the reaction system after the polycondensation reaction of the dihydroxy compound (A) and the carbonic acid compound both described above has proceeded partially.

Temperature of the reaction is not particularly limited. The temperature is generally in the range of 100° to 330° C., preferably 180° to 300° C. It is more preferable that the temperature is gradually increased to 180° to 300° C. in a manner coordinated with the progress of the reaction. When the temperature is lower than 100° C., the reaction proceeds slowly. A temperature higher than 330° C. is sometimes not preferable because degradation of the polymer occurs.

Pressure of the reaction is adjusted in accordance with the vapor pressure of the monomer used and the temperature of the reaction. The pressure is adjusted to realize effective reaction and not particularly limited. In general, the pressure is kept at or slightly higher than atmospheric pressure, such as 1 to 50 atmosphere (760 to 38,000 torr), at the initial stage of the reaction. At the later stage of the reaction, the pressure is kept at a value lower than atmospheric pressure. The pressure is often adjusted to 0.01 to 100 torr at the final stage of the reaction.

Time of the reaction can be adjusted to achieve the target molecular weight. The time is generally about 0.2 to about 10 hours.

To summarize the advantages obtained by the invention, the branched polycarbonate having the excellent properties can be obtained by the process of the present invention. When the branched polycarbonate is produced by the interfacial method, the branched polycarbonate having excellent heat stability and not causing mold corrosion can be produced. When the branched polycarbonate is produced by the melting method, the branched polycarbonate excellent in both heat stability and color tone can be produced.

The invention will be understood more readily with reference to the following examples; however, these examples are intended to illustrate the invention and are not to be construed to limit the scope of the invention.

Preparation of a Branching Agent Containing Sulfur in an Amount Within the Specified Range Content of sulfur in a commercial 1,1,1-tris(4-hydroxyphenyl)ethane was measured by the microcoulometry and found to be 234 ppm. The commercial 1,1,1-tris(4-hydroxyphenyl)ethane in an amount of 1 g equivalent was dissolved in 1 liter of 2.0N aqueous solution of sodium hydroxide. The prepared solution was then filtered with a 10 μm filter. The filtered solution was neutralized with 2.0N hydrochloric acid and a purified 1,1,1-tris(4-hydroxyphenyl)ethane was separated. Content of sulfur in the purified 1,1,1-tris(4-hydroxyphenyl)ethane was measured and found to be 10 ppm. Samples of 1,1,1-tris(4-hydroxyphenyl)ethane containing 120 and 84 ppm of sulfur were prepared by mixing the purified 1,1,1-tris(4-hydroxyphenyl)ethane containing 10 ppm of sulfur and the crude 1,1,1-tris(4-hydroxyphenyl)ethane containing 234 ppm of sulfur in suitable amounts.

EXAMPLE 1

Into a vessel of 50 liter inner volume equipped with a stirrer, 20.1 g (0.069 mol) of the sample of 1,1,1-tris(4-hydroxyphenyl)ethane containing 120 ppm of sulfur, 2100 g (9.2 mol) of bisphenol A, 9.4 liter of 2.0N aqueous solution of sodium hydrochloride, and 8 liter of methylene chloride were charged and the mixture was mixed by stirring. Phosgen was blown into the solution thus prepared for 30 minutes. Then, 70.4 g (0.47 mol) of p-tert-butylphenol was added for the reaction with the product in the solution. To the reaction product, 100 g (0.44 mol) of bisphenol A, 2.3 g (0.022 mol) of triethylamine, and 4.5 liter of 0.2N aqueous solution of sodium hydroxide were added. The mixture was allowed to react for 40 minutes and an aqueous phase and an organic phase obtained were separated. Thus, methylene chloride solution of a PC oligomer having a concentration of 320 g/liter was obtained as the organic phase. Concentration of the chloroformate group in the solution was 0.7 mol/liter.

Into a homogenizer, 8 liter of the methylene chloride solution of the PC oligomer thus obtained, 573 g (2.5 mol) of bisphenol A, 400 g of 7.25 % by weight aqueous solution of sodium hydroxide, 1.7 g (0.017 mol) of triethylamine, and 6 liter of methylene chloride were charged. The mixture was allowed to react by stirring in such a condition that the interfacial area of the emulsion is 90 to 100 m²/liter.

After 60 minutes, the reaction mixture obtained was separated to an aqueous phase and a methylene chloride phase containing the formed polymer. The methylene chloride phase was washed with water, an acid (0.1N hydrochloric acid), and water, successively. Methylene chloride was removed from the organic phase in a vacuum at 40° C. to obtain a white PC powder.

Viscosity average molecular weight, YI (yellow index), taking-off parameter and mold rust were measured using the PC thus obtained. Results are shown in Table 1.

EXAMPLES 2 and 3 and Comparative Example 1

PC powders were obtained and evaluated according to the same method as that in Example 1 except that branching agents having different sulfur contents were used as shown in Table 1. Results are shown in Table 1.

EXAMPLES 4 and 5 and Comparative Example 2

Into a nickel steel autoclave of 1.4 liter inner volume equipped with a stirrer, 228 g (1.0 mol) of bisphenol A (BPA), 229 g (1.07 mol) of diphenyl carbonate (obtained by purifying a commercial product by recrystallization from ethanol), 2.1 g (0.007 mol) of a sample of 1,1,1-tris( 4-hydroxyphenyl)ethane having a sulfur content shown in Table 1, and 1×10⁻⁵ tool of Bu₄NBH₄ were charged. Gas in the vessel was replaced with nitrogen by repeating the replacing operation five times. The mixture was heated to 180° C. to thaw bisphenol A and diphenyl carbonate.

Then, temperature of the mixture was increased further. As soon as the temperature reached 220° C., stirring was started and a slight stream of nitrogen was passed through the system. Distillation of the formed phenol started. The temperature of the reaction mixture was kept at 220° C. for 4 hours.

Subsequently, the degree of vacuum was increased while the temperature was gradually increased from 200° to 280° C. over 1 hour for removing residual diphenyl carbonate and effecting transesterification reaction simultaneously. In the final stage of the reaction, the reaction was allowed to proceed for 1 hour while the pressure was kept at 0.5 torr. Thus, a viscous clear condensate (PC) was obtained in the autoclave.

The product was dissolved in methylene chloride and viscosity average molecular weight was measured.

The viscous clear condensate was solidified by cooling, pulverized and then granulated by treating with an extruder of 200° to 270° C. Pellets thus obtained was injection molded to prepare sample pieces. YI, taking-off parameter and mold rust were measured with the sample pieces thus prepared. Results are shown in Table 1.

TABLE 1

|  | sulfur content (ppm) | | viscosity average | | | |
| --- | --- | --- | --- | --- | --- | --- |
|  | in branching agent | in polymer | molecular weight, Mv | YI | taking-off parameter | mold rust |
| Example 1 | 120 | 0.5 | 24500 | 3.3 | 5.4 | 3 |
| Example 2 | 84 | 0.3 | 24500 | 3.3 | 5.4 | 2 |
| Example 3 | 10 | <0.1 | 24900 | 2.9 | 5.8 | 1 |
| Example 4 | 120 | 1.1 | 25500 | 3.9 | 6.1 | 1 |
| Example 5 | 10 | <0.1 | 25100 | 3.3 | 5.9 | 1 |
| Comparative Example 1 | 234 | 1.2 | 24400 | 4.0 | 5.4 | 5 |
| Comparative Example 2 | 234 | 2.1 | 25200 | 9.2 | 6.0 | 2 |

The measurements shown in Table I were conducted according to the following methods.

(1) Viscosity average molecular weight (Mv): Intrinsic viscosity [η] of a methylene chloride solution was measured at 20° C. and viscosity average molecular weight was calculated from the intrinsic viscosity.

(2) YI: YI was measured by using a color meter SM-3 (a product of Suga Shikenki Co., Ltd.) in accordance with Japanese Industrial Standard K7103-77.

(3) Mold rust: By using an injection molding machine, 120 shots of the short shot molding were made at 320° C. Rust formation on the mold after 24 hours was visually observed and evaluated by classifying into five grades. A larger number shows easier formation of rust.

(4) Taking-off parameter: A branched PC was molded into a cylindrical sample of 3 mm diameter by extruding from a small scale extruder (for example, an extruder produced by Tanabe Plastic Kikai Co., Ltd.; diameter, 20 mm; rotation speed, 40 rpm; set temperature, 280° C.). The cylindrical sample was left standing in a silicone oil at 200° C. for 15 minute. The sample was then attached to rotating rollers of an extension rheometer (for example, a product of Iwamoto Seisakusho Co., Ltd.). After eliminating sag, the sample was extended at a specified rotation speed of rollers. Change of tension and sample diameter were observed by using a video recorder equipped with a timer. From the result of the measurement of change in diameter with time, strain rate was obtained according to the equation:

$$\ln\{d_t/d_0\} = -(\xi/2) \cdot t$$

wherein $d_0$ is the initial diameter, $d_t$ is the diameter at t second, and $\xi$ is the strain rate. From the strain rate $\xi$ thus obtained, elongational viscosity $Z_t$ was obtained according to the equation:

$$Z_t = F_t/S_t \xi$$

wherein $F_t$ and $S_t$ are tension and sectional area, respectively, at the time t, and $S_t$ can be obtained from $d_t$ by calculation. Taking-off parameter A can be calculated from the elongational viscosities $Z_{30}$ and $Z_3$ at the time of 30 and 3 seconds, respectively, at the temperature of 200° C. and the constant strain rate of 0.1 $\sec^{-1}$ according to the equation:
$A = Z_{30}/Z_3$ (5) Measurement of sulfur content in a branching agent: By using a chlorine and sulfur analysis apparatus TSX-10 (a product of Mitsubishi Kasei Co., Ltd.), 50 mg of a sample was thermally decomposed at the condition of the inlet temperature of 850° C., the outlet temperature of 950° C., the flow speed of an argon stream of 250 milliliter/minute, and the flow speed of an oxygen stream of 200 milliliter/minute. The measurement was conducted by coulometric titration.

(6) Sulfur content in a polymer: Sulfur content in a polymer was measured by the organic elemental analysis.

What is claimed is:

1. A process for producing a branched polycarbonate, which comprises:

interfacially reacting a difunctional phenol and phosgene thereby preparing a polycarbonate oligomer; reacting said polycarbonate oligomer in a preliminary condensation reaction with a polyfunctional branching agent containing 200 ppm or less of sulfur represented by the formula (I):

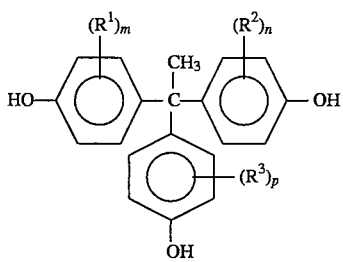

wherein $R^1$, $R^2$, and $R^3$ are independently hydrogen, an alkyl group having 1 to 5 carbon atoms or halogen, and m, n and p are each 0 or an integer of 1 to 4, under certain conditions such that the interfacial area of the emulsion is 40 m²/liter or more; and then bringing the product of the preliminary condensation into polycondensation with a difunctional phenol and a monofunctional phenol under certain conditions such that interfacial area of the emulsion is 40 m²/liter or more.

2. A process for producing a branched polycarbonate, which comprises:

interfacially polymerizing a difunctional phenol, a polyfunctional branching agent containing 200 ppm or less of sulfur which is a compound of the formula (I):

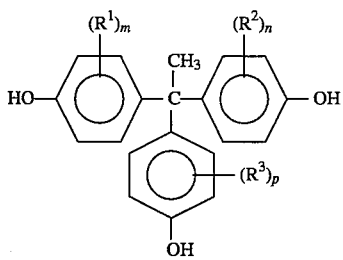

wherein $R^1$, $R^2$, and $R^3$ each independently are hydrogen, an alkyl group of 1 to 5 carbon atoms or halogen, and m, n and p are each 0 or an integer of 1 to 4 and phosgene, thereby preparing a phosgenation reaction product;

reacting the reaction product of the first step with a monofunctional phenol and then with a difunctional phenol to prepare a PC oligomer; and bringing said PC oligomer into polycondensation with a difunctional phenol under certain conditions in which the interfacial area of the emulsion is 40 m²/liter or more.

3. A process for producing a branched polycarbonate which comprises:

reacting phosgene, a difunctional phenol and polyfunctional branching agent containing 200 ppm or less of sulfur which is a compound of the formula (I):

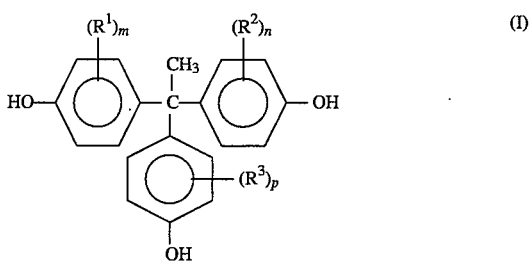

wherein $R^1$, $R^2$, and $R^3$ are each independently hydrogen, an alkyl group of 1 to 5 carbon atoms or halogen, and m, n and p are each 0 or an integer of 1 to 4, under melt conditions.

4. A process for producing a branched polycarbonate according to claim 1, wherein the branching agent contains 150 ppm or less of sulfur.

5. A process for producing a branched polycarbonate according to claim 1, wherein the branching agent contains 100 ppm or less of sulfur.

6. A process for producing a branched polycarbonate according to claim 1, wherein the compound represented by the general formula (I) is a compound selected from the group consisting of 1,1,1-tris(4-hydroxyphenyl)ethane, 1,1,1-tris(4-hydroxy-3-methylphenyl)ethane, 1,1,1-tris(4-hydroxy-3,5-dimethylphenyl)ethane, 1,1,1-tris(3-chloro-4-hydroxyphenyl)ethane, 1,1,1-tris(3,5-dichloro-4-hydroxyphenyl)ethane, 1,1,1-tris(3-bromo-4-hydroxyphenyl)ethane, 1,1,1-tris(3,5-dibromo-4-hydroxyphenyl)ethane, tris(4-hydroxyphenyl)methane, tris(4-hydroxy-3-methylphenyl)methane, tris(4-hydroxy-3,5-dimethylphenyl)methane, tris(3-chloro-4-hydroxyphenyl)methane, tris(3,5-dichloro-4-hydroxyphenyl)methane, tris(3-bromo-4-hydroxyphenyl)methane, and tris(3,5-dibromo- 4-hydroxyphenyl)methane.

7. A process for producing a branched polycarbonate according to claim 1 or 2, wherein the branching agent is used in such an amount that the content of the unit of the branching agent in the branched polycarbonate is 0.05 to 2.0% by tool based on the amount of the unit of the difunctional phenol.

8. A process for producing a branched polycarbonate according to claim 1 or 2, wherein the branching agent is used in such an amount that the content of the unit of the branching agent in the branched polycarbonate is 0.1 to 1.0% by mol based on the amount of the unit of the difunctional phenol.

* * * * *

UNITED STATES PATENT AND TRADEMARK OFFICE
CERTIFICATE OF CORRECTION

PATENT NO. : 5,473,046
DATED : December 5, 1995
INVENTOR(S) : Shigeki Kuze et al.

It is certified that error appears in the above-indentified patent and that said Letters Patent is hereby corrected as shown below:

On the title page, insert Item [30], Foreign Application Priority Data,

--Oct. 5, 1993 [JP] JAPAN.................5-249175--

Signed and Sealed this

Twenty-third Day of April, 1996

Attest:

BRUCE LEHMAN

Attesting Officer

Commissioner of Patents and Trademarks